Richard J. Belardi,
Leslie Moles,
INVENTORS.
BY.
Charles N. Haughey
ATTORNEY.

Richard J. Belardi,
Leslie Moles,
INVENTORS,
BY.

Charles J. Haughey

ATTORNEY.

Oct. 12, 1965   R. J. BELARDI ETAL   3,211,353
THERMOCOMPRESSION BONDING CHISEL
Original Filed Sept. 20, 1960   7 Sheets-Sheet 5

Richard J. Belardi
Leslie Moles,
INVENTORS,
BY.

Charles S. Haughey

ATTORNEY.

Fig. 14.

Richard J. Belardi,
Leslie Moles,
INVENTORS.

BY

Charles J. Haughey

ATTORNEY.

Oct. 12, 1965    R. J. BELARDI ETAL    3,211,353
THERMOCOMPRESSION BONDING CHISEL
Original Filed Sept. 20, 1960    7 Sheets-Sheet 7

Fig. 15.

Richard J. Belardi
Leslie Moles,
INVENTORS,
BY.
Charles P. Haughey
ATTORNEY.

United States Patent Office 3,211,353
Patented Oct. 12, 1965

3,211,353
THERMOCOMPRESSION BONDING CHISEL
Richard J. Belardi, Anaheim, and Leslie Moles, Newport Beach, Calif., assignors to Hughes Aircraft Company, Culver City, Calif., a corporation of Delaware
Original application Sept. 20, 1960, Ser. No. 57,317. Divided and this application Sept. 16, 1963, Ser. No. 314,830
6 Claims. (Cl. 228—3)

The present invention relates to thermocompression bonding, and more particularly to thermocompression bonding of a pair of gold wire leads to a silicon semiconductor crystal. This application is a division of application Serial No. 57,317 filed September 20, 1960.

In the fabrication of silicon transistors having a pair of leads attached to a common surface, as in a mesa type transistor, many difficulties are encountered in making the attachment of leads to the crystal on a production basis. Among these are making a reliable bond between lead wires and the silicon crystal without soldering, alloying, or overheating; bonding to the crystal in a manner to provide extremely small emitter and base regions for purposes of well known electrical properties, such as for fast switching operations; use of a process which lends itself to rapid and repeated operations with a minimum of maintenance of tools or equipment; and reduction of manual operations to reduce cost per unit while substantially increasing device reliability and process yield.

It is a principal object of this invention to overcome the foregoing difficulties, and with a process and apparatus which is capable of adjustment to a variety of device configurations and characteristics.

In the thermocompression bonding of very fine lead wires to semiconductor crystals, a particular problem is encountered in establishing a proper atmospheric condition about the area of the intended bond without overly cooling the materials to be bonded, or so blowing the wires as to make their precise location in bonding very difficult.

It is thus an object of this invention to provide a method and apparatus for thermocompression bonding fine wires to semiconductor devices with great precision, and under desired atmospheric conditions.

In the bonding of relatively malleable metals, such as gold, at elevated temperatures and with the aid of a stylus, or chisel, it is a particular problem to obtain proper bonding without smearing or pickup of wire material on to the chisel, and yet producing a configuration of bonded wire having a good bond and a preferential breaking position.

Another object of this invention is to provide a method and apparatus for thermocompression bonding malleable metals, such as gold, without smearing or collecting the metal on the chisel, and with a preferential break point in the wire so bonded.

A further problem in thermocompression bonding of malleable metals to silicon semiconductor devices is the breaking of films such as an oxide film on the silicon crystal to initiate the bond between the silicon and the metal, and the attainment of a permanent bond resistant to an oxygen containing atmosphere. Poor yields of reliable, physically strong bonds have been attributed to a silicon oxide film on the crystal which interferes with the bonding operation, or to formation of an oxide at the bonded interface during subsequent exposure to oxygen containing atmosphere.

A further object of this invention is to provide a method of and apparatus for breaking such films as may be present on the silicon crystal to initiate the bonding of a malleable metal thereto, and for forming reliable bonds. The above and other objects and advantages of this invention will be apparent from the balance of this specification, disclosing the preferred embodiment of the invention illustrated, and in the accompanying drawings and claims forming a part thereof, wherein:

Figure 1:
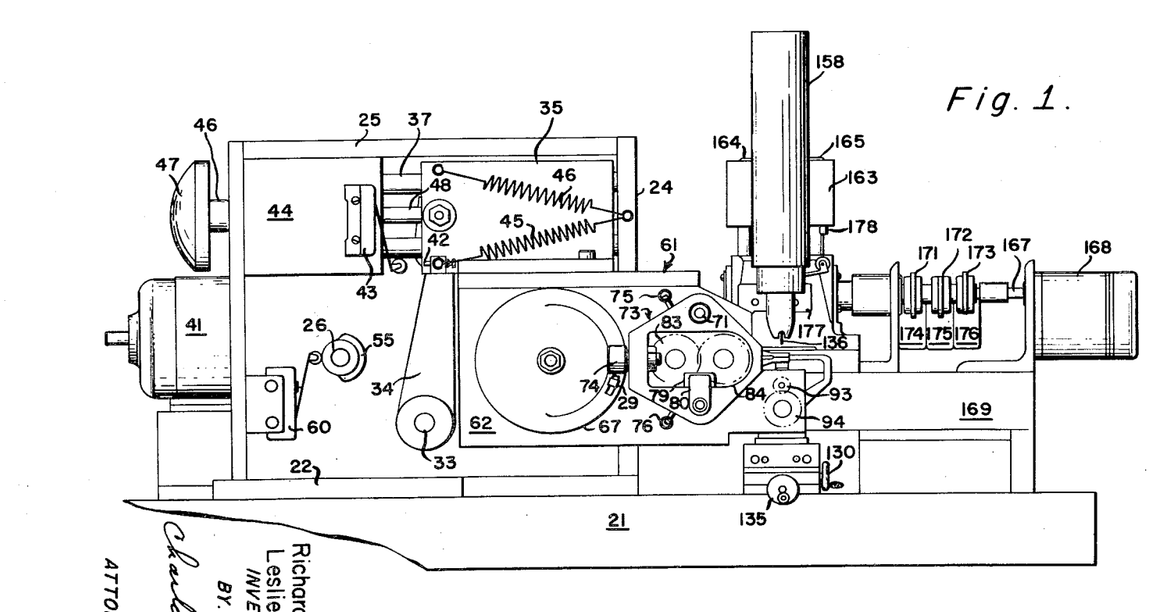
FIG. 1 is an elevational view of apparatus for thermocompression bonding according to this invention.

According to the present invention, as illustrated in the drawings, and with particular reference to FIG. 1, a semiconductor device thermocompression bonding apparatus comprises an integrated system whose prime functional elements are a wire feeding mechanism, a device support and heater, a bonding chisel support, and atmosphere supply mechanism.

The wire feed mechanism is assembled onto a base frame member 22 which is in turn supported on a rigid table 21. As shown in more detail in FIGS. 2 and 3, a wire feed mechanism support assembly, comprising side frame elements 23 and 24 and top frame element 25, is securely fastened to the base frame member 22. A wire feed mechanism translating drive shaft 26 is supported on the base frame member 22 by side frame elements including element 27 and a bearing 28 therein. A cam 31 on the shaft 26 drives a cam follower 32 which is pivotally supported on a pivot shaft 33. Arm 34 supported on shaft 33, moves a wire feed mechanism support frame 35 by a drive pin 36, the frame 35 being slideably supported, for horizontal translation, on support rods 37 and 38 rigidly secured to frame elements 23 and 24.

Figure 2:
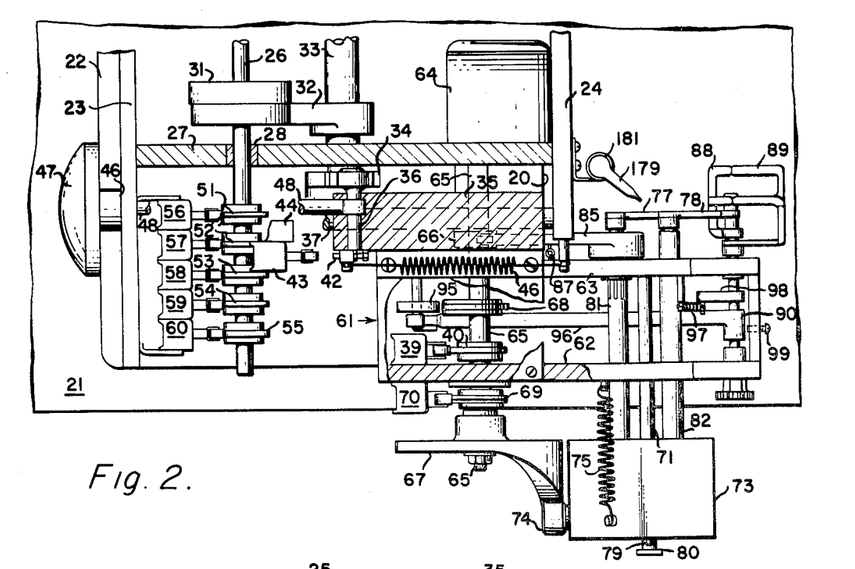
FIG. 2 is a plan view, partly in section, of a portion of the apparatus of FIG. 1.
Figure 3:
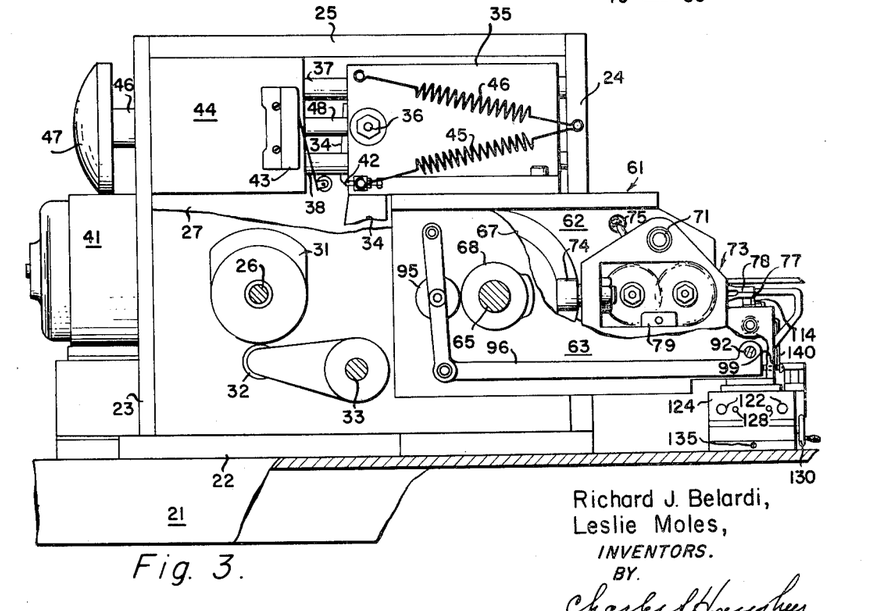
FIG. 3 is an elevational view of a portion of the apparatus of FIG. 1 with parts broken away.

In operation, a main drive motor 41 drives the drive shaft 26 through a reduction gear, not shown, to rotate the cam 31. The arm 34 is moved to the left as the cam follower 32 is actuated by the cam 31, forcing the support frame 35 to move to the left on support rods 37 and 38. As the frame 35 moves to the left, an adjustable stop 42 actuates a switch 43 which is supported on the frame elements 23 and 25 by a side plate 44. Upon further turning of the shaft 26, the cam 31 allows the support frame 35 to be returned to its original position under the influence of springs 45, 46 acting between the support frame 35 and the frame element 24. The rest position of the support frame 35 as shown is determined by a shoulder 49 on a handle 47 threadedly adjustable on a rod 48 secured to the drive pin 36. As the drive shaft 26 rotates, a series of cams 51, 52, 53, 54 and 55 operate a series of switches 56, 57, 58, 59 and 60 in turn as determined by the respective cams.

Figure 7:
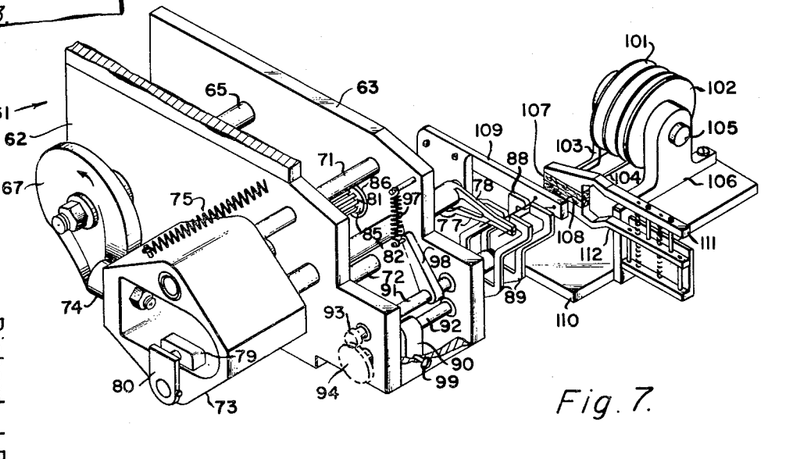
FIG. 7 is a perspective view of a portion of the apparatus of FIG. 1 showing a wire feeding mechanism in detail.

The wire feed mechanism, which is illustrated in perspective in FIG. 7, is supported on a box member 61 having box sides 62, 63 secured to frame 35. A motor 64 carried by an extension 20 of the box member 61 drives a main shaft 65 supported on the sides 62 and 63. The main shaft, in turn, carries motion drive cams 66, 67 and 68 together with timing cams 69 and 39, which are preferably of the split type for adjustment of dwell time on their lobes.

A wire puller mechanism is supported on the box member on support rods 71, 72. A head 73 is slideably supported on the support rods 71, 72 and is driven thereon by a cam follower 74 which follows cam 67. A pair of springs 75, 76 hold the follower 74 against the cam 67. A small, adjustable cam section 29 is mounted on cam 67 to move the head 73 to break the bonding wires and trip a switch 79 by a trip 80 mounted on the head 73. This makes cam 67 effectively a two step cam. A pair of wire puller jaws 77 and 78 are supported on rotatable shafts 81, 82 carried by the head 73. The shafts carry intermeshing gears 83, 84 to rotate one of the shafts 81, 82 in a direction opposite to the rotation of the other shaft. A cam follower 85 is slideably supported in a bearing 86 and, by splines on the shaft 81, in driving relation therewith to turn the shaft 81 and consequently raise the upper wire puller jaw 77; and, by interaction of gears 83, 84, simultaneously drop lower wire puller jaw 78 responsive to action of the cam 66 on the main shaft 65. A spring 87 extending between the cam follower 85 and the box member 61 acts to hold the cam follower 85 in contact with the drive cam 66.

A double pair of wire spacing fingers 88 and 89 is supported on turnable shafts 91 and 92 which are in turn interconnected by a pair of gears 93 and 94 for counter-rotation. A cam follower 95 is connected by a linkage 96 to turn the lower shaft 92 responsive to cam 68 on the main shaft 65, acting against a spring 97 between an arm 98 on the upper shaft 91 and the box member 61. A stop 99 acting on a portion of the linkage 96 is adjustable to determine the spacing between fingers 88 and 89 in their "closed" position.

A pair of reels 101, 102 of malleable wire 103, 104 suitable for thermocompression bonding, preferably a relatively soft gold wire (which may contain other elements) for bonding to a silicon semiconductor crystal, is supported on a shaft 105 and its support frame 106 which are in turn supported on an extension 110 of the box member 61 to be an integral part of the wire drawing mechanism. Strands of the gold wires 103, 104 are passed through a pair of resilient wipers 107, 108 and thence through orifices in a frame member 109 designed to maintain spacing of the wire strands for purposes of automatic handling. The resilient wipers 107, 108 are supported on the extension 110 by a pair of spring biased jaws 111, 112 to maintain slight friction on the wire strands for tensioning the strands, as will subsequently appear. An atmosphere duct 179 is supported on the side frame element 24 with its nozzle directed to the retracted position of the wire puller jaws 77 and 78, as will appear. A solenoid valve 181 in the duct 179 controls gas flow therein.

The wire drawing apparatus is shown in perspective in FIG. 7 in position ready for a bonding operation. In operation, after bonding of the wires 103 and 104 to a semiconductor crystal, the puller jaws 77 and 78 are preferably pulled while the wires are securely held on the crystal by the bonding chisel to break the ends of the wires at the crystal, as will be subsequently explained in detail. This operation will of course depend on the length of the leads desired, and whether they should extend in two directions from the bond.

From the position as shown in FIG. 7, the fingers 88 and 89 are rotated from the wire bonding position to an open position, and the wire puller jaws 77 and 78 are opened to release the severed wire ends.

The valve 181 in duct 179 is opened to direct a blast of atmosphere gas on to the opening jaws 77 and 78 to blow the wire ends therefrom. The jaws 77 and 78 are then moved toward frame member 109 and are closed on the ends of the wire strands extending therefrom by rotation of the shafts 81 and 82, and the head 73 then pulls the jaws 77, 78, hence the wires, through the orifices in the frame member 109. Tension is maintained on the wires by the wipers 107 and 108, and the spacing fingers 88 and 89 are rotated to the position as shown in FIG. 7 to adjust the distance between the wires to the spacing between the leads desired in the bonding operation.

Figure 4:
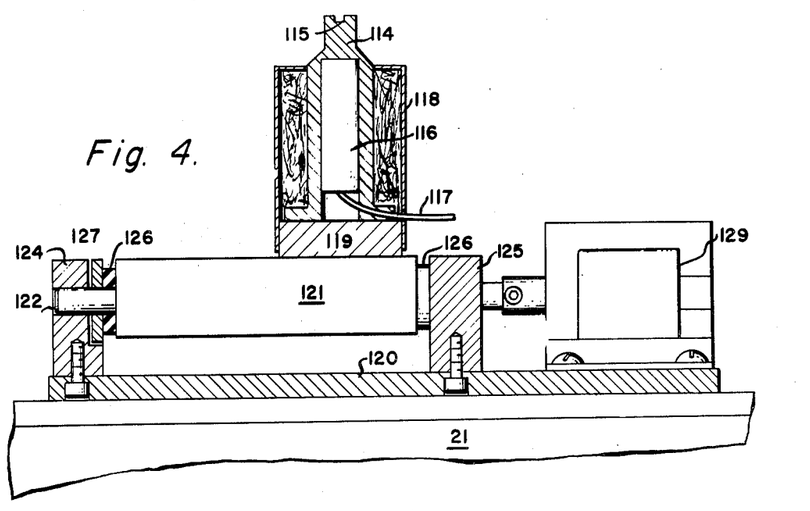
FIG. 4 is an elevational view, partly in section, of a portion of the apparatus of FIG. 1, showing in detail a heater and vibrator mechanism.
Figure 5:
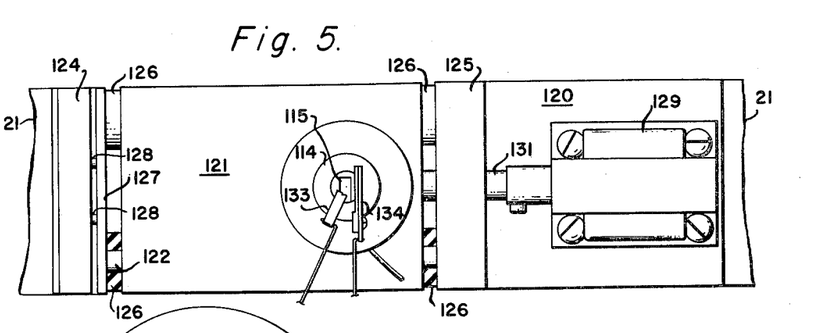
FIG. 5 is a plan view of a portion of the apparatus of FIG. 1 showing in detail a device support and holder mechanism.

Silicon semiconductor crystals for thermocompression bonding attachment of gold wire leads must be heated for proper bonding of the wires. For this purpose a heater assembly is illustrated in detail in FIGS. 4, 5 and 6. A heater 114 having a recess 115 in its upper surface is provided with an internal heating element 116, serviced by a power supply and thermocouple cable 117, and is provided with an insulated cover 118. The heater 114 is supported on a base 119 which is in turn fastened securely to a platform 121. The platform 121 is slideably supported on a pair of substantially horizontal support rods 122, which are in turn anchored in supports 124, 125 secured through a base 129 and to an adjustable cross slide mechanism, driven by screw handles 130 and 135, supported in turn on table 21. Resilient washers 126, such as neoprene rubber, are inserted on the rods 122, at each end thereof between the supports 124, 125 and the platform 121. A compression plate 127 is provided with bolts 128 to compress the resilient washers 126 against the platform 121 and support 125. A vibratory motor 129, preferably a 60 cycle alternating current vibrator, is supported by the base 120 and coupled to the platform 121 by a shaft 131. When the motor 129 is energized, the platform is driven thereby through the shaft 131, and the amplitude of vibration is determined by the compression on the washers 126 as produced by the plate 127.

Figure 6:
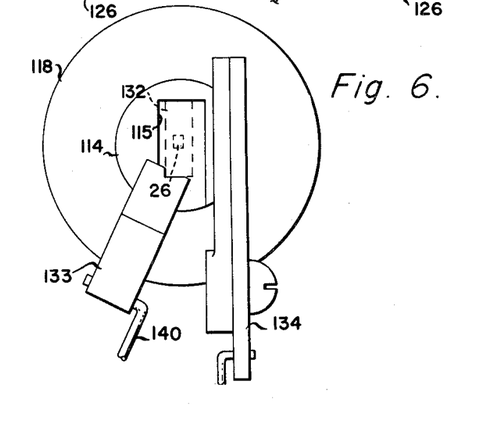
FIG. 6 is an enlarged plan view of a portion of the apparatus of FIG. 5.

Crystals to be processed are preferably mounted by conventional and known techniques to a tab, such as a rectangular metal tab 132 shown in dashed lines in FIG. 6. A clamping jaw 133 resiliently holds the tab in the recess 115 during the operations. A pair of wire cutting scissors 134 is provided to cut the lead wires from the strands 103, 104 at the proper length after the bonding operation.

Figures 8, 9:
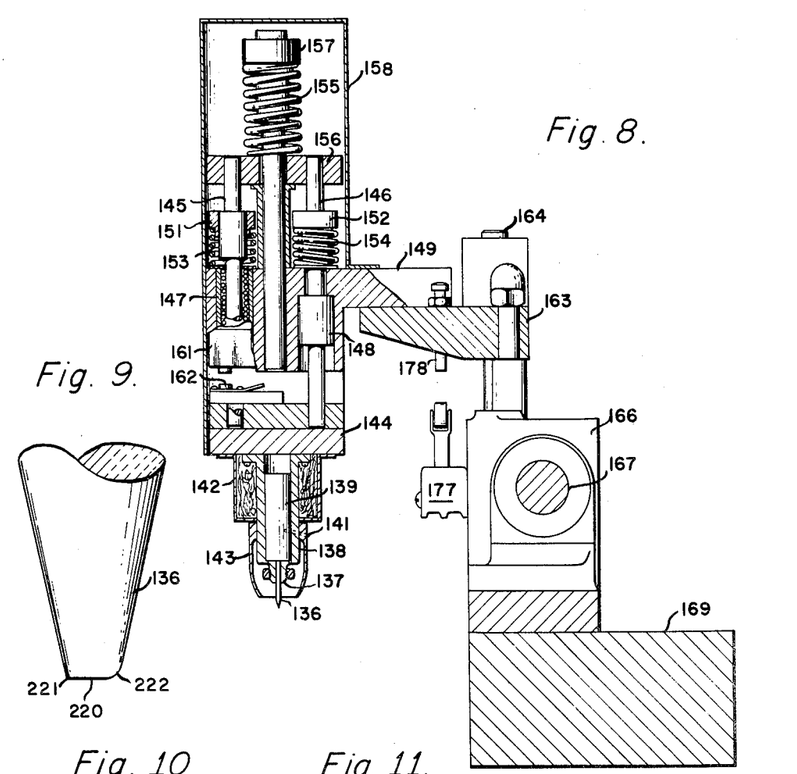
FIG. 8 is an elevational view, partly in section, of a portion of the apparatus of FIG. 1 showing in detail a bonding chisel support mechanism.
FIGS. 9, 10 and 11 are detail views of the bonding chisel of FIG. 8.
Figure 10:
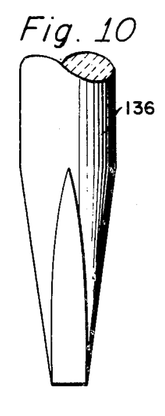
Figure 11:
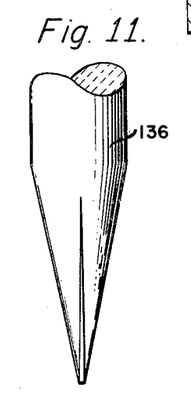

The bonding chisel mechanism of FIG. 1 is partly shown in section in FIG. 8. A bonding chisel 136 is shown in enlarged detail in FIGS. 9, 10, and 11, is supported in a collet 137 forming part of a chisel heater 138, which is internally heated by a heating element 139 serviced through a cable, not shown. The heater 138 is partly protected by an insulated cover 142, and an atmosphere shroud 143 is secured to the heater in a manner to preheat atmosphere supplied thereto and to direct the same around the area of the point of the chisel 136. A stream of protective atmosphere gas is supplied to the inside of the shroud to be heated and discharged parallel to the chisel.

The chisel heater 138 is secured to a plate 144 which is resiliently supported on a pair of vertical rods 145, 146 passing through bearings 147, 148 in a platform 149 in a manner to move freely therein in a vertical direction. The rods 145, 146, through collars 151, 152 thereon, rest on springs 153, 154 which are in turn supported on the platform 149. A damping spring 155 acts downwardly on the rods 145, 146 through a crosshead 156 and a collar 157. The relative position of the chisel with respect to the platform in its suspended condition is adjustable by adjustment of the positions of collars 151, 152 and 157 on the respective shafts, preferably by a threaded engagement therebetween. A cover 158 is supported on the platform 149 to enclose the resilient support for the chisel. A switch 161 is mounted on the platform 149 opposite a trip 162 to actuate the switch as the relative motion of the chisel with respect to the platform indicates that the chisel has made contact with wires to be bonded. The springs 153, 154 and 155 are selected to maintain a substantially constant pressure or load on the chisel as it actuates the springs. The chisel and its associated sprung parts could alternatively be suspended by a counterbalanced support, or a hydraulic support.

The platform 149 is secured to a crosshead member 163 which rides on a pair of vertical guide rods 164, 165 and is raised and lowered thereon by a rack and pinion drive 166 through a shaft 167, actuated by a motor 168. Cams 171, 172 and 173 on the shaft 167 actuate respective switches 174, 175 and 176 as the shaft turns. The motor 168 and its associated cams, switches and the vertical rods 164 and 165 are supported on a plate 169 which is in turn supported on the table 21. A switch 177 is mounted on the rack and pinion drive 166 opposite an adjustable trip 178 so that the switch 177 is tripped as the chisel 136 is lowered.

Figure 15:
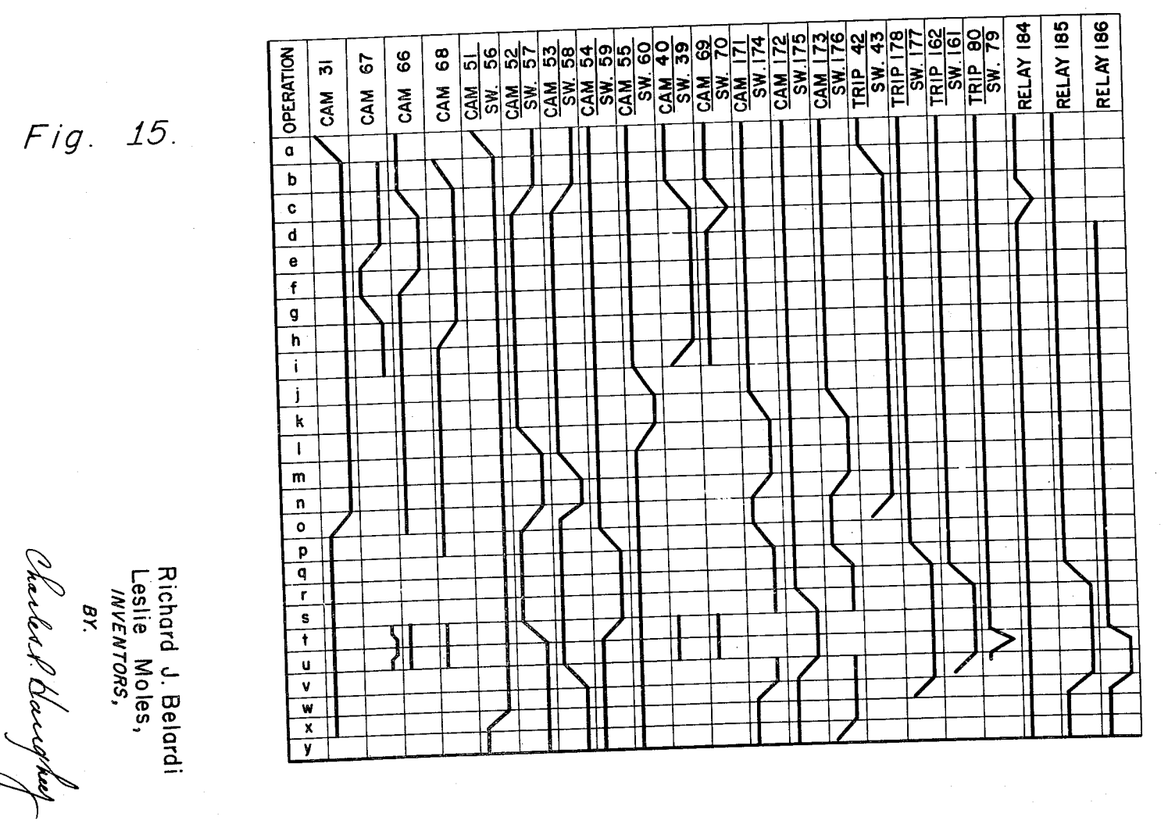
FIG. 15 is a mechanism timing chart corresponding to the apparatus of FIGS. 1–11 and the circuit of FIG. 12.

The temperature control circuit is shown on the electric circuit diagram of FIG. 15, at the left side. Power is fed through an upper heater switch 211 and a variable resistance 212 to the upper heater 139. The temperature of the atmosphere gas shroud and the chisel is controlled manually by preadjustment of the variable resistance 212. Power is fed through a lower heater switch 213, a variable resistance 214, and a temperature control instrument 215 to the lower heater 116. The maximum heat input is manually adjusted to a bit in excess of that required to maintain temperature, and temperature control is achieved by the instrument 215 responsive to a thermocouple 216 which may be positioned in the heater 114 as close to the recess 115 therein as possible.

Figure 14:
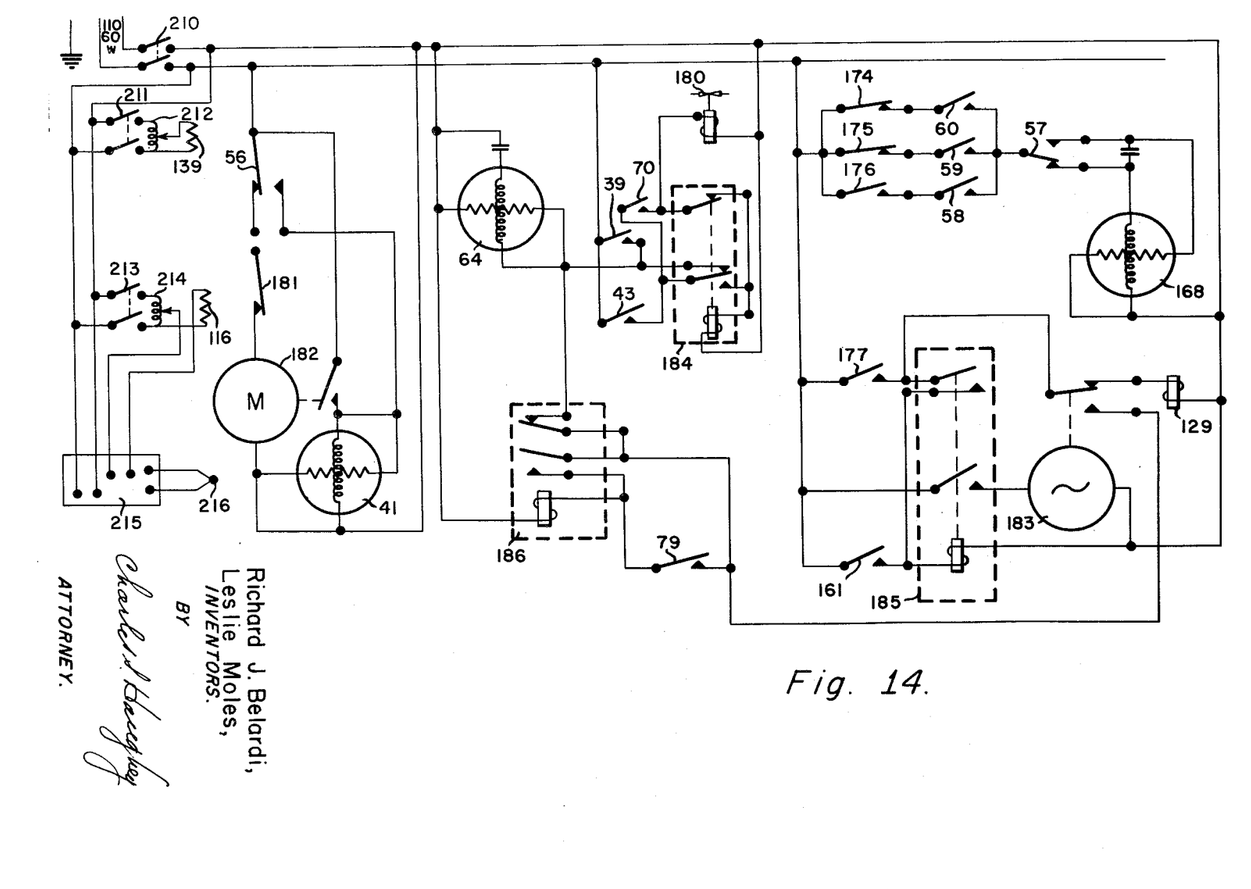
FIG. 14 is a diagram of an electrical control circuit for the apparatus of FIGS. 1–11.

Referring more particularly to the electric circuit diagram of FIG. 14, and the timing chart of FIG. 15, the apparatus operates as follows: main power switch 210 is closed to start the cycle. A starting timer 182 is closed through switches 56 and 181, and, after a delay period of about 7 seconds during which a finished tab 132 is removed and one preparatory to bonding is inserted in its place, timer 182 times out and closes its contact. Motor 41 starts. (a) Cam 51 actuates switch 56 to open the timer circuit and provides a holding circuit for motor 41 and reset the timer 182. (b) Cam 31 drives support frame 35 to the left, and trip 42 closes switch 43 to start motor 64. (c) Cam 40 closes switch 39 after switch 43 is closed to hold in the motor 64 circuit. Cam 68 opens fingers 88, 89, then cam 66 rotates jaws 77, 78 open, and cam 69 closes switch 70 to energize the solenoid of gas valve 180 and admit the blast of atmosphere from the duct 179 to blow the ends of gold wires from between the jaws 77, 78, as they are opened by the action of a cam 66 and cam follower 85. As the switch 70 is closed relay 184 is energized to open a circuit through switch 43 to the motor 64 and to retain a holding circuit for the motor 64 through switch 39. (d) After cam 69 opens switch 70 to close the valve 180, then (e) cam 67 allows follower 74 to drop, hence head 73 moves forward to move puller jaws 77, 78 adjacent the frame 109. (f) Cam 66 then actuates follower 85 to close the puller jaws 77, 78 on the ends of the wires 103, 104 extending through the orifices in frame 109.

(g) Cam 67 then raises follower 74 to move the head and the puller jaws to pull the wires 103, 104 from the reels 101, 102. (h) Cam 68 then drops follower 95 and, through linkage 96, 90 stop 99, shafts 91 and 92, and intermeshing gears 93 and 94, the fingers 88 and 89 are closed to position the wires 103 and 104 to the desired spacing, as determined by the adjustable stop 99 acting on the portion 90 of link 96. (i) Cam 40 then opens switch 39 to stop the motor 64 which drives the wire feed mechanism. (j) Cam 55 closes switch 60 to complete a circuit through 174 and switch 57 to lower the chisel by motor 168 to a position above the tab 132 for a visual check of the alignment of the tab and device thereon and chisel. As the chisel lowers (k) cam 173 closes upper limit switch 176. Cam 171 opens switch 174 to stop the motor 168 for alignment with the chisel above the heater 114, and before switch 177 trips. The position of the heater 114 is then adjusted with respect to the chisel by means of the cross slide and handles 130 and 135 to the proper alignment between the tab 132 and the respective chisel 136. (l) Cam 55 opens switch 60, and cam 52 then reverses switch 57 to the raise position. (m) Cam 53 closes switch 58 and completes the circuit through switch 176 and switch 57 to energize the motor 168 in a counterclockwise direction to raise the chisel. (n) As the chisel raises, cam 171 closes switch 174 and cam 173 opens switch 176 to stop the chisel by stopping motor 168. Cam 173 closes switch 176, as the chisel lowers. (o) Cam 52 then returns switch 57 to the reversal position of motor 168 so that it will next be energized in a clockwise direction to lower the chisel, and cam 53 opens switch 58. Cam 31 moves the feed mechanism to the bonding position, and trip 42 opens switch 43 to stop motor 64. (p) Cam 54 closes switch 59 to make a circuit through switches 175 and 57 to energize the motor 168 and lower the chisel for the bonding operation. Cam 171 opens switch 174. (q) Cam 173 again closes switch 176 as the chisel lowers, and the chisel approaches bonding position a trip 178 on the cross head 163 closes switch 177 to complete a circuit through vibrator motor 129. The motor 129 imparts a horizontal vibration to the heater 114 to assist the bonding of the wires to a device on tab 132 as will be explained subsequently. Motor 168 continues down, and as the chisel meets resistance during the bonding operation, (r) the mechanism on plate 144 raises with respect to the platform 149 closing switch 161 by trip 162 to energize a relay 185 which in turn starts a timer 183. A holding circuit through the relay 185 is established through switch 177. (s) Cam 172 opens switch 175 to stop the lowering of the chisel. (t) Cam 54 opens switch 59 after timer 183 opens, usually about 5 seconds, vibrator motor 129 stops and motor 64 is energized through relay 186. Cam 52 reverses switch 57 to position for raising the chisel, and turning shaft 65 and cam 67 to bring cam 29 under the follower 74 to jog the head 73 and thus through jaws 77 and 78 pull the wires 103 and 104 to break them from the device on tab 132 to which they have just been bonded. (u) Switch 79 mounted on the head 73 is actuated by a trip 80 mounted on rod 72 closing a circuit to energize relay 186 thus breaking the circuit to motor 64 and holding the relay 186 energized. (v) Cam 53 closes switch 58 to energize motor 168 and raise the chisel 136. As the chisel raises, trip 162 releases switch 161, cam 172 closes switch 175, and switch 177 opens, de-energizing relay 185 and relay 186, and timer 183, resetting the timer. (w) As motor 168 raises the chisel, cam 171 closes switch 174, and at the top cam 173 opens switch 176 to stop motor. (x) Cam 51 moves switch 56 to open to stop motor 41 and energize timer 182 through a circuit through switch 181. Switch 181 is provided as a manual switch to be opened in advance to stop cycle at end of normal cycle.

It will be noted that according to the foregoing description the chisel is lowered for a first alignment and is then raised and subsequently lowered for an alignment and a bonding operation. With an experienced operator the first alignment may be omitted by the removal of switches 60 and 170 and the removal of corresponding cams 55 and 171. Once the position of the wires has been adjusted by the handle 47 under the chisel 136 when the wire feed mechanism is in bonding position the apparatus will automatically return the wire feed mechanism to the same position during each cycle so that it should be necessary thereafter only to adjust the position of the heater and the device supported thereon with respect to the chisel.

It has been found that in the bonding of malleable material leads such as substantially pure gold to semiconductor devices having oxide film thereon, particularly to silicon semiconductor devices, the bonding is facilitated by subjecting a wire to pressure under a chisel point at elevated temperature below the eutectic temperature of the respective materials, accompanied by a vibration in the plane of the surface of the semiconductor, i.e., transverse to the motion of the chisel, and preferably parallel to the linear direction of the wires before and during the initial position of the pressure contact. The apparatus above described provides for such vibration through the action of the vibrator motor 129.

It is believed that the support strength obtainable through the use of vibration during the initial position of the thermocompression bonding cycle is due to the action of the vibration in breaking and penetrating such oxide films as may be present on the silicon crystal or on the wire, and in locally heating the adjoining surfaces to at least the gold silicon eutectic temperature, by friction heating, to form a strong bond. This bond is resistant to subsequent exposure to air or oxygen containing gases which, without the friction heating step, would subsequently fail with attendant oxide formation in the bond face.

In the case of bonding gold, or gold-base alloys, to silicon semiconductor crystals, the crystal surface is cleaned of oxides by well known solvent steps and rinsing, and it is protected, as by acetone liquid or inert forming gas, during processing. The crystal is supported on a heated surface to maintain the surface to which the gold wire is to be bonded. When contacted by the wire under chisel pressure, the crystal surface should be between about 290° C. and 370° C. The chisel is kept somewhat cooler than the crystal to avoid or minimize smearing of gold from the wire and adherence thereof to the chisel.

The initial pressure of the chisel on the wire forms a notch in the wire and keys them together, insuring that relative motion during vibration will be between the wire and the crystal. Although no physical evidence has yet been found, beyond the improved bond strength and its resistance to oxidation between the wire and the crystal after bonding, it is believed that minute volumes of gold-silicon eutectic must be formed at the bond interface. Bonding temperatures below the eutectic must be used, but if too low, no improved bond is attained. For gold-silicon bonds, when the wires are held in contact with the crystal surface, 290° C. is about the lowest crystal temperature which may be used with the vibration step to form the improved bond. The oxygen resistance of this bond is particularly valuable because the device may be deliberately exposed to an oxygen containing atmosphere at 325° C, after bonding with no bond deterioration, to form an insulating silicon oxide layer on the device.

While the bonding temperature is such that friction heating may locally heat to the gold-silicon eutectic temperature, the vibration is not a very critical operation. Frequencies of 60 c.p.s. up may easily be used, and amplitudes between 0.1 mil and 0.01 mil have been found to be sufficient and in a sufficiently localized area to form the bond when bonding about 1.0 mil gold wire to a semiconductor crystal. This bond is not affected by gold or crystal alloy or impurity type, since no electric heating is involved.

To facilitate the bonding and breaking of the wires preferentially from one side of the bond, the selection of the chisel shape and its material are very important. The chisel material surface should be an oxide material, and very hard, to deform the malleable metal without material pickup. Metal and diamond chisels were found to be unsatisfactory in that the metal wire would smear onto the chisel and build up thereon. A crystal of the corundum family, particularly a sapphire crystal, has the desired properties—it is an oxide crystal, of about 7.5 hardness on the Mohs scale, and its resistance to temperature is sufficient for the relatively high temperature required for bonding gold wire to a silicon crystal. Such crystals will take a very high polish. The polished corundum surface does not smear the gold, and the gold does not adhere thereto to cause substantial buildup. The sapphire crystal 136 is strong enough at the operating temperatures to deform the gold wire without crystal breakdown or chipping at the sharp edge.

The sapphire crystal 136, as shown in enlarged views 9, 10 and 11, has a substantially flat portion 220 forming a working face of the chisel perpendicular to the length of the crystal shaft, a sharp edge 221 on one edge thereof and a rounded edge 222 on the opposite edge of the flat portion as best shown in greatly enlarged scale in FIG. 9. The ratio of diameters of the edges should be at least 10:1 to facilitate breaking the bonded wire at the point where the sharp edge contacted the wire during bonding.

Figure 12:
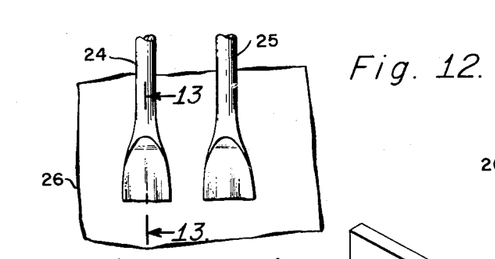
FIG. 12 is a plan view of a completed bond of two wires to a crytsal by this apparatus.
Figure 13:
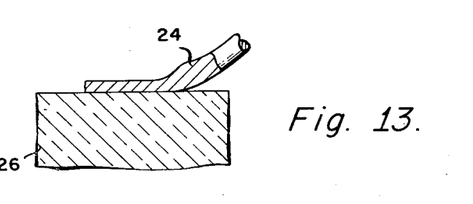
FIG. 13 is a sectional view of FIG. 12 taken on lines 13—13.

As shown in FIGS. 12 and 13, a pair of gold wires 24, 25 bonded to a silicon crystal surface 26 according to this invention will be spread from the force of the flat portion 220 of the chisel 136, and the excess wire will be broken at the edge thereof where the chisel edge 221 contacted the wire. A more gradual wire thickness change results from the rounded edge 222 of the chisel, making the corresponding end of the wire strongly attached to the crystal. The more gradual transition causes the other lead wire end to break preferentially.

Silicon semiconductor devices made according to this invention may be stabilized in an oxygen bake at 325° C. for several hours with no bond deterioration, and there is no apparent electrical effect observed to suggest a formation of recrystallized silicon, nor any other change of device properties which would be expected if the device were heated above the gold silicon eutectic temperature.

What is claimed is:

1. A bonding chisel for thermocompression bonding malleable metal to a semiconductor crystal, comprising: an elongated sapphire crystal having a wedge shape at one end thereof, said wedge end having a flat portion substantially perpendicular to the length of the chisel, and having one edge of said flat portion substantially sharper than the opposite edge thereof whereby to promote preferential breaking of a bonded lead wire, after bonding, at the sharper chisel edge impression.

2. A bonding chisel for thermocompression bonding of malleable wire to a semiconductor crystal, comprising: an elongated shaft having a wedge shape at one end thereof, said wedge shape having a flat portion substantially perpendicular to the axis of the shaft, and having a rounded edge on said flat portion opposite a sharp edge thereon whereby to promote preferential breaking of a bonded lead wire, after bonding, at the sharper chisel edge impression.

3. A bonding chisel for thermocompression bonding of a malleable wire to a semiconductor crystal, comprising: a shaft having a flat portion on one end thereof, having a sharp edge on said flat portion and a rounded edge thereon opposite said sharp edge whereby a wire thermocompression bonded by said chisel may be more easily broken at the point where said sharp edge contacted the wire.

4. A bonding chisel according to claim 3, having a sapphire surface.

5. A bonding chisel according to claim 3, said chisel being of a corundum crystal.

6. A bonding chisel for thermocompression bonding of malleabale metal wire to a semiconductor crystal, comprising a shaft of material of the corundum family, having a polished, substantially flat portion perpendicular to the length of the shaft, and having a radius of curvature on one edge of said portion substantially longer than the radius of curvature on the opposite edge of said portion whereby to promote preferential breaking of a bonded lead wire, after bonding, at the sharper chisel edge impression.

References Cited by the Examiner
UNITED STATES PATENTS

| | | | |
|---|---|---|---|
| 2,530,284 | 11/50 | Capps | 274—38 |
| 2,639,634 | 5/53 | Sowter | 78—82 |
| 2,815,689 | 12/57 | Barnes | 78—82 |
| 3,006,067 | 10/61 | Anderson | 29—470 |
| 3,091,849 | 6/63 | Cohen | 29—494 |
| 3,149,510 | 9/64 | Kulicke | 78—82 |

CHARLES W. LANHAM, *Primary Examiner.*

WILLIAM J. STEPHENSON, *Examiner.*